US010583739B2

(12) United States Patent
Yoshimura et al.

(10) Patent No.: US 10,583,739 B2
(45) Date of Patent: Mar. 10, 2020

(54) INTERIOR STRUCTURE FOR VEHICLE

(71) Applicant: MAZDA MOTOR CORPORATION, Hiroshima (JP)

(72) Inventors: Toshiteru Yoshimura, Hiroshima (JP); Masato Sadano, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 87 days.

(21) Appl. No.: 15/759,740

(22) PCT Filed: Nov. 18, 2016

(86) PCT No.: PCT/JP2016/084245
§ 371 (c)(1),
(2) Date: Mar. 13, 2018

(87) PCT Pub. No.: WO2017/090523
PCT Pub. Date: Jun. 1, 2017

(65) Prior Publication Data
US 2019/0047418 A1 Feb. 14, 2019

(30) Foreign Application Priority Data
Nov. 26, 2015 (JP) ................................ 2015-230883

(51) Int. Cl.
*B60K 37/02* (2006.01)
*B60H 1/00* (2006.01)
(Continued)

(52) U.S. Cl.
CPC ......... *B60K 37/02* (2013.01); *B60H 1/00028* (2013.01); *B60H 1/0055* (2013.01);
(Continued)

(58) Field of Classification Search
CPC ........ B60K 37/02; B60K 37/00; B60K 35/00; G02B 27/01; B62D 25/14; B60H 1/00028; B60H 1/0055; B60H 1/00564
USPC .............................. 296/70, 208, 192, 190.09
See application file for complete search history.

(56) References Cited

U.S. PATENT DOCUMENTS

2009/0261612 A1* 10/2009 Takayama .............. B60K 37/02 296/70
2014/0293239 A1* 10/2014 Shimizu ............ G02B 27/0149 353/52
(Continued)

FOREIGN PATENT DOCUMENTS

JP H04-104724 U 9/1992
JP 2003-118426 A 4/2003
(Continued)

OTHER PUBLICATIONS

International Search Report issued in PCT/JP2016/084245; dated Feb. 7, 2017.

*Primary Examiner* — Jason S Morrow
*Assistant Examiner* — E Turner Hicks
(74) *Attorney, Agent, or Firm* — Studebaker & Brackett PC

(57) ABSTRACT

An interior structure for a vehicle includes an instrument panel disposed below a windshield, an air conditioning duct provided inside the instrument panel, and a head-up display device having a housing structure and mounted to the instrument panel, the head-up display device being configured to project information on the windshield. The head-up display device has a heat dissipating portion on an outer peripheral face of the housing. The air conditioning duct has a facing portion that faces the heat dissipating portion so as to be able to exchange heat with the heat dissipating portion.

5 Claims, 13 Drawing Sheets

16 122 11 14 12 14 4 44 413 S5 53 532 402 401 40 15 151 UP FRONT REAR DOWN 41 51 43 123 2 5 57 S1 42 521 63 S2 54 62 611 52 61 522 6 32 31 3

(51) Int. Cl.

| | |
|---|---|
| ***B60K 37/00*** | (2006.01) |
| ***B60K 35/00*** | (2006.01) |
| ***H04N 9/31*** | (2006.01) |
| ***G03B 21/16*** | (2006.01) |
| ***G02B 27/01*** | (2006.01) |
| ***B62D 25/14*** | (2006.01) |

(52) U.S. Cl.

CPC ......... *B60H 1/00564* (2013.01); *B60K 35/00* (2013.01); *B60K 37/00* (2013.01); *B62D 25/14* (2013.01); *G02B 27/01* (2013.01); *G02B 27/0149* (2013.01); *G03B 21/16* (2013.01); *H04N 9/3144* (2013.01); *B60H 2001/003* (2013.01); *B60H 2001/00214* (2013.01); *B60K 2370/1529* (2019.05); *B60K 2370/334* (2019.05); *G02B 2027/0196* (2013.01)

(56) References Cited

U.S. PATENT DOCUMENTS

| | | | | |
|---|---|---|---|---|
| 2016/0039389 | A1* | 2/2016 | Kato | B60H 1/3414<br>454/127 |
| 2016/0121852 | A1* | 5/2016 | Yoshimura | B60H 1/00564<br>454/127 |
| 2017/0282812 | A1* | 10/2017 | Yoshimura | B60R 11/0229 |
| 2018/0099542 | A1* | 4/2018 | Sakakibara | B60H 3/00 |

FOREIGN PATENT DOCUMENTS

| | | | |
|---|---|---|---|
| JP | 2003-261067 | A | 9/2003 |
| JP | 2014-153578 | A | 8/2014 |
| JP | 2015-020624 | A | 2/2015 |

* cited by examiner

UP
DOWN
LEFT
RIGHT
1
10
173
14
13
12
11
172
121
XI
VI
V
IV
2
15
3
171

UP
DOWN
FRONT
REAR
RIGHT
LEFT
11
12
13
14
15
151
2
123
171
3
5
122
4
16
161
1

11
12
14
15
151
123
2
31
3
5
4
122
122R
16
161
10
122F
14
UP
DOWN
FRONT
REAR

REAR
UP
DOWN
FRONT
11
12
14
15
151
123
2
40
402
401
43
122
S2
63
54
31
3
32
611
521
522
6
44
42
61
16
4
52
S1
57
413
S5
14
62
5
53
532
41
51

REAR
UP
DOWN
FRONT
11
15
151
123
14
12
2
40
402
401
421
S3
423
124
43
12
54
3
16
42
44
4
52
53
41
14
51
5

UP
FRONT
LEFT
DOWN
RIGHT
REAR
40
402
401
41
412
414
413
411
422
424
42
45
47
471
421
423

FRONT
REAR
LEFT
RIGHT
7
40
56
561
45
71
75
G
4B
47
4A
43
4
41
711
51
46
2
5
55
72
73
171

5
7
71
74
75
561
56
586
S2
54
52
532
57
S1
531
53
S1
S2
542
57
532
RIGHT
REAR
UP
DOWN
FRONT
LEFT
531
51
3
73
72
55

7
71
74
75
46
40
4
44
421
S3
S2
43
54
S5
411
122
S3
53
S4
412
422
3
73
72
UP
RIGHT
REAR
FRONT
LEFT
DOWN

INTERIOR STRUCTURE FOR VEHICLE

TECHNICAL FIELD

The present invention relates to an interior structure for a vehicle, the structure including a head-up display device.

BACKGROUND ART

In recent years, it is becoming common to mount a head-up display (HUD) device to an instrument panel of a vehicle such as an automobile (e.g., Patent Literature 1). The HUD device projects information (an image) useful to a driver on a combiner or a windshield itself disposed in a direction of a driver's line of sight during driving. The projected image is reflected by the windshield and forms a virtual image. A driver visually recognizes the virtual image overlaid on a front view from the vehicle.

In general, the HUD device has a housing structure and includes a projection light source, which generates a projection light beam, in the housing. The light source generates heat as a result of a light emitting operation. Therefore, it is known to provide a heat dissipating portion to the HUD device to dissipate heat in the housing to the outside through the heat dissipating portion.

To project various kinds of information on the windshield, a projection area of the light beam by the HUD device naturally becomes broad. To form a projection image that is large in display size, it is necessary to secure a long optical path from the projection light source to the windshield. Because the instrument panel and the windshield are close to each other and it is impossible to have the enough light path length between them, it is necessary to secure the light path length by means such as disposing mirrors for reflecting the projection light beam in the housing of the HUD device. Therefore, the HUD device tends to be a large-size heavy-weight unit.

However, the instrument panel easily accumulates heat inside itself because of its structure, which may reduce the HUD device heat dissipating effect by means of the heat dissipating portion. Although it is conceivable to attach a cooling functional component such as a cooling fan, it is difficult to additionally dispose such a cooling functional component in a narrow instrument panel to which the large-size HUD device has been mounted.

CITATION LIST

Patent Literature

Patent Literature 1: Japanese Patent Application Laid-open No. 2003-261067

SUMMARY OF INVENTION

Problems to be Solved by the Invention

It is an object of the present invention to improve heat dissipating performance of a head-up display device mounted to an instrument panel without adding a cooling functional component.

According to an aspect of the present invention, there is provided an interior structure for a vehicle, the interior structure includes an instrument panel disposed below a windshield, an air conditioning duct provided inside the instrument panel, and a head-up display device having a housing structure and mounted to the instrument panel, the head-up display device being configured to project information on the windshield, wherein the head-up display device has a heat dissipating portion on an outer peripheral face of the housing, and the air conditioning duct has a facing portion that faces the heat dissipating portion so as to be able to exchange heat with the heat dissipating portion.

DESCRIPTION OF EMBODIMENTS

[Overview of Interior Structure for Vehicle]

Figure 1:
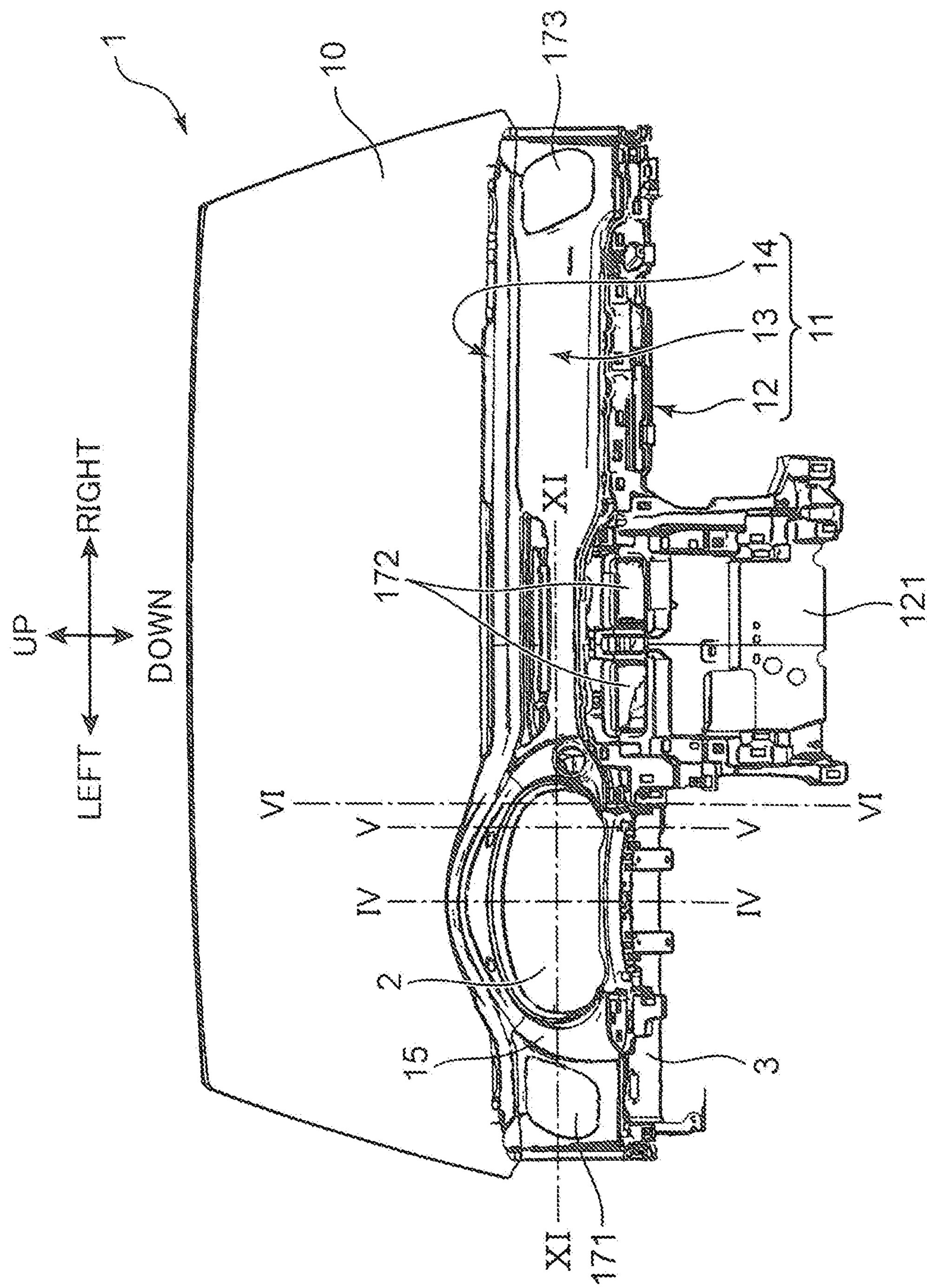
FIG. 1 is a front view showing an interior structure of a front portion of a vehicle, to the structure the present invention is applied.
Figure 2:
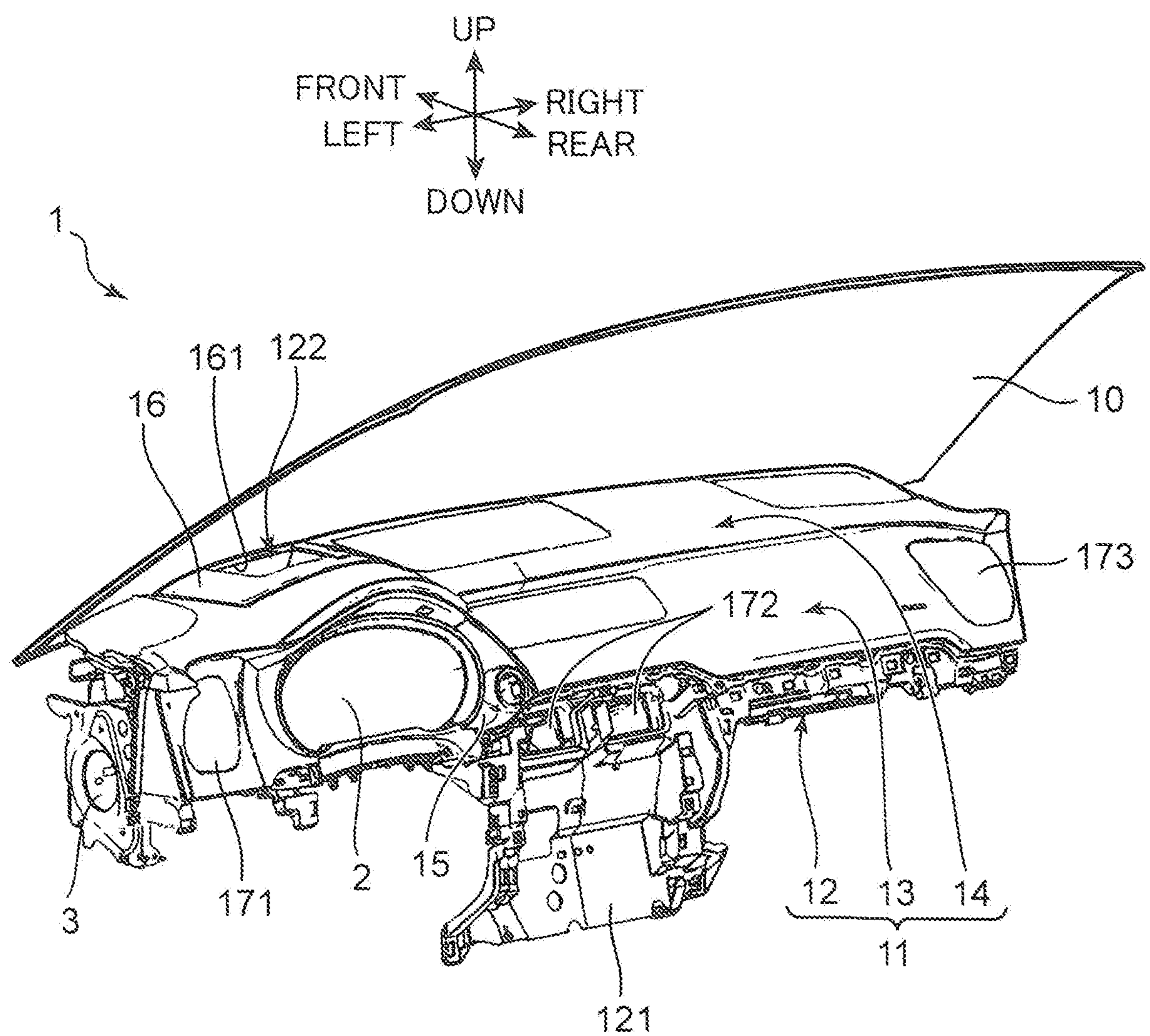
FIG. 2 is a perspective view of the interior structure.
Figure 3:
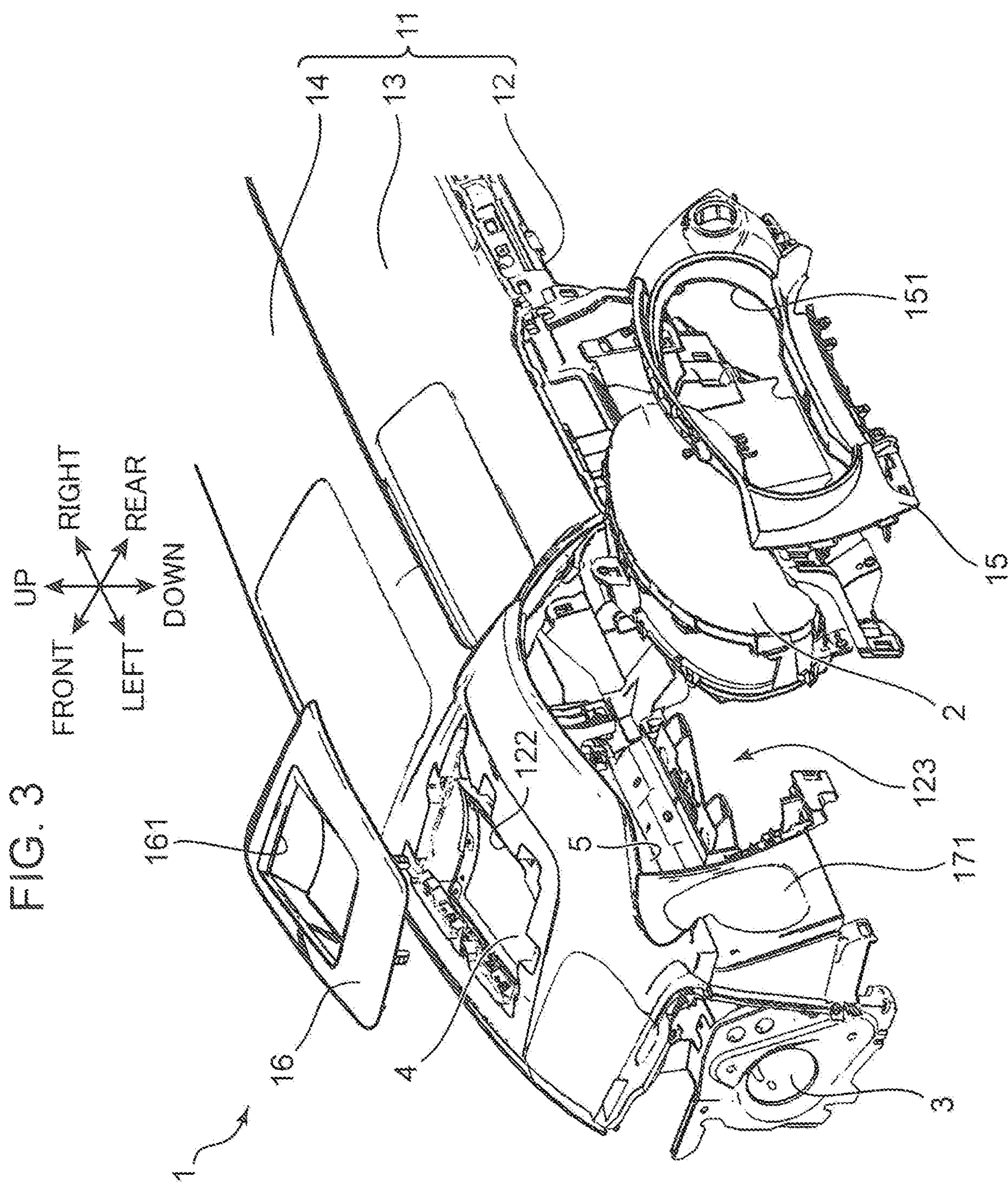
FIG. 3 is an exploded perspective view of an instrument panel.

An embodiment of the present invention will be described below in detail based on the drawings. FIG. 1 is a front view showing a front portion of an interior structure for a vehicle 1, to the structure the present invention is applied, and FIG. 2 is a perspective view of the interior structure. In these views, a windshield 10 and an instrument panel 11 of the interior structure are taken out and illustrated. FIG. 3 is an exploded perspective view of the instrument panel 11. In these views, arrows indicating “front” and “rear” in a front-rear direction of the vehicle 1, arrows indicating “left” and “right” in a vehicle width direction, and arrows indicating “up” and “down” in a vehicle height direction are drawn. Arrows indicating “front”, “rear”, “up”, “down”, “left”, and “right” drawn in the following views correspond to the indications of the directions in FIGS. 1 to 3.

The instrument panel 11 is disposed below the windshield 10 and extends substantially throughout a width in the vehicle width direction (left-right direction). The instrument panel 11 includes an instrument panel main body 12, a facing cover 13, and an upper face cover 14. The instrument panel main body 12 is a member formed by a molded article made of hard resin, having a left-right width corresponding to the vehicle width, and including a plurality of frame portions for housing meters, components related to air conditioning, a navigation system, audio instruments, and the like provided to the vehicle 1. A console portion 121 dividing a driver's seat and a passenger's seat from each other hangs downward from a center in the left-right direction of the instrument panel main body 12.

The facing cover 13 and the upper face cover 14 are members made of urethane foamed material or the like and forming surface layer portions of the instrument panel 11. The facing cover 13 covers a face of the instrument panel 11 facing the seats. The upper face cover 14 covers an upper face, i.e., a face facing the windshield 10, of the instrument panel 11.

Below the instrument panel 11, an instrument panel reinforcement 3 extending horizontally in the left-right direction is disposed. The instrument panel reinforcement 3 is formed by a metal cylindrical body with high rigidity and fixed at its left and right opposite ends to a vehicle body frame (not shown). A lower face of the instrument panel 11 is supported by the instrument panel reinforcement 3.

As shown in FIG. 3, on a left side (driver's seat side) of the instrument panel 11, a meter panel 2 and a head-up display device 4 (hereinafter referred to as HUD device 4) are mounted. The meter panel 2 is a panel unit mounted to the instrument panel 11 so as to face the driver's seat and having analog or digital display portions such as a vehicle speedometer and a fuel gauge. As will be described later in detail, the HUD device 4 is supported by a support member 5 in the instrument panel 11.

The HUD device 4 is a unit having a housing structure and projects various kinds of information on the windshield 10. The information is driving assist information such as a traveling speed of the vehicle, speed limit information in a traveling section, warning signs, and instruction arrows for navigation, for example. The HUD device 4 generates a projection image of the information and projects the image on the windshield 10. A virtual image of the projection image reflected by the windshield 10 is formed ahead of a driver's line of sight.

In the housing of the HUD device 4, a projection light source 4A (see FIG. 11) including an LED matrix and a TFT color display and mirrors that reflect a light beam generated by the projection light source 4A are housed. Normally, the instrument panel 11 and the windshield 10 are close to each other and it is impossible to have an enough light path length to form the projection image of a predetermined size between them. Therefore, the plurality of mirrors are disposed in the housing to cause multiple reflection of the projection light beam to thereby secure the required light path length. To project the various kinds of information on the windshield 10, a projection area of the light beam by the HUD device 4 naturally becomes broad. To form the projection image that is large in display size, it is necessary to secure the long optical path length and therefore the housing of the HUD device 4 increases in size and weight.

The instrument panel main body 12 (instrument panel 11) has an upper opening 122 for projection by the HUD device 4 in the upper face and a side opening 123 for mounting of the meter panel 2 in the face facing the seats (face facing a rear side of the vehicle 1). The upper opening 122 is a rectangular opening facing the windshield 10 and the projection light beam from the HUD device 4 passes through the upper opening 122 and travels toward the windshield 10. The upper opening 122 is smaller than the housing 40 (see FIGS. 7 and 8) of the HUD device 4 in those sizes. In other words, after the vehicle 1 is completed, it is impossible to take the HUD device 4 out of the instrument panel 11 through the upper opening 122.

The side opening 123 has such a size that the meter panel 2 long in the left-right direction can be fitted into the side opening 123. Since the meter panel 2 is larger than the HUD device 4, the side opening 123 has such a size that the housing of the HUD device 4 can pass through the side opening 123. In other words, after the vehicle 1 is completed, it is possible to take the HUD device 4 out of the instrument panel 11 through the side opening 123.

A meter cover 15 is fitted into the side opening 123 and an opening cover 16 is fitted into the upper opening 122, respectively. The meter cover 15 has an opening 151 through which a display face of the meter panel 2 is exposed and is mounted to the face of the instrument panel main body 12 facing the seats so as to cover a peripheral edge portion of the meter panel 2 with the meter panel 2 fitted into the side opening 123. The opening cover 16 has a rectangular projection opening 161 and is mounted to the upper face of the instrument panel main body 12 so as to cover the upper face of the HUD device 4.

Inside the instrument panel 11, an air conditioning duct 7 (described later) (see FIGS. 11 to 13) is disposed. Conditioned air flowing through the air conditioning duct 7 is blown out into a vehicle interior through a surface of the instrument panel 11. As blow outlets for the conditioned air, the instrument panel 11 has a left blow outlet 171 disposed on the side of the driver's seat, middle blow outlets 172 disposed above the console portion 121, and a right blow outlet 173 disposed on a side of the passenger's seat.

[Support Structure for HUD Device]

Figure 4:
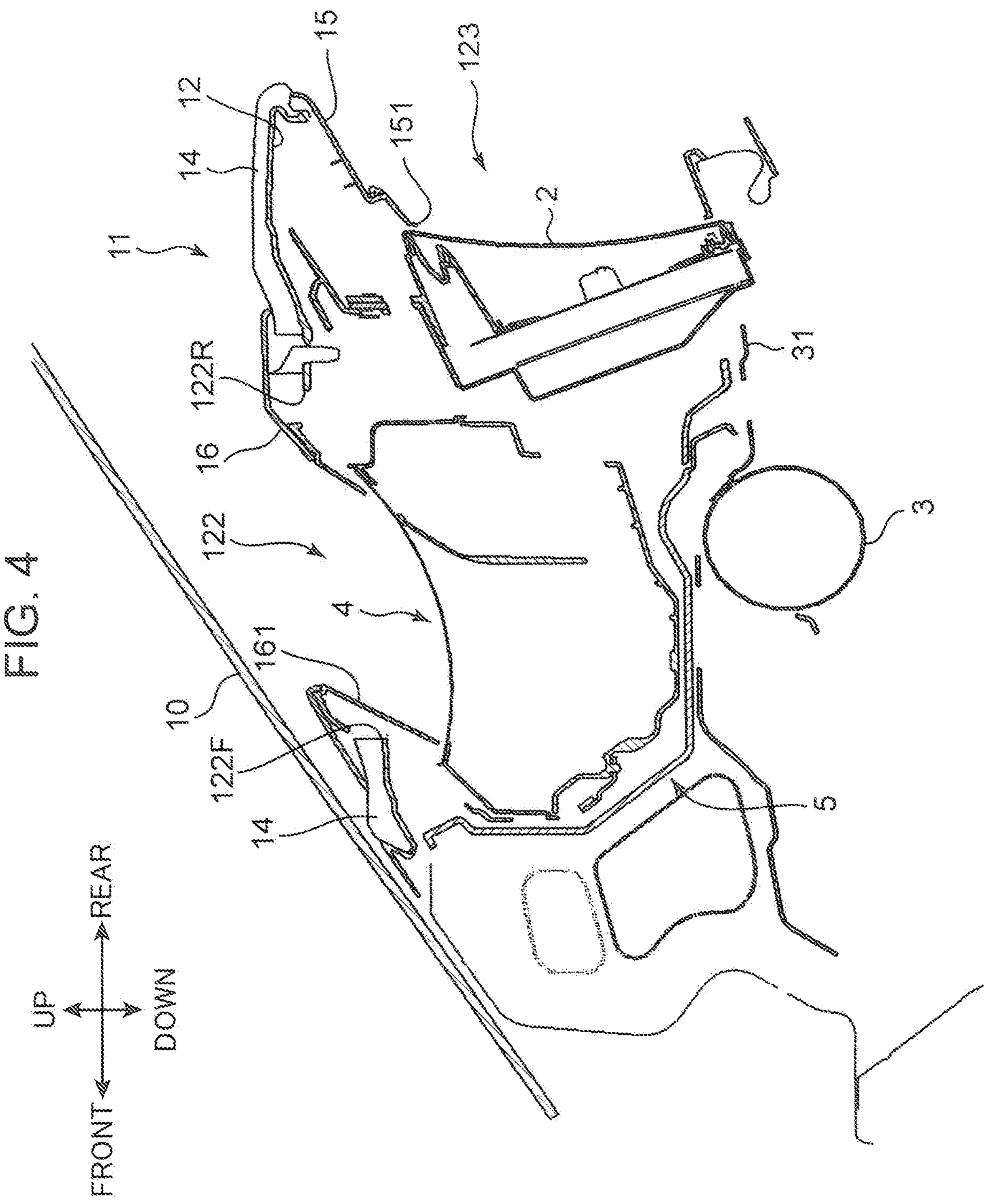
FIG. 4 is a schematic sectional view taken along line IV-IV in FIG. 1.
Figure 5:
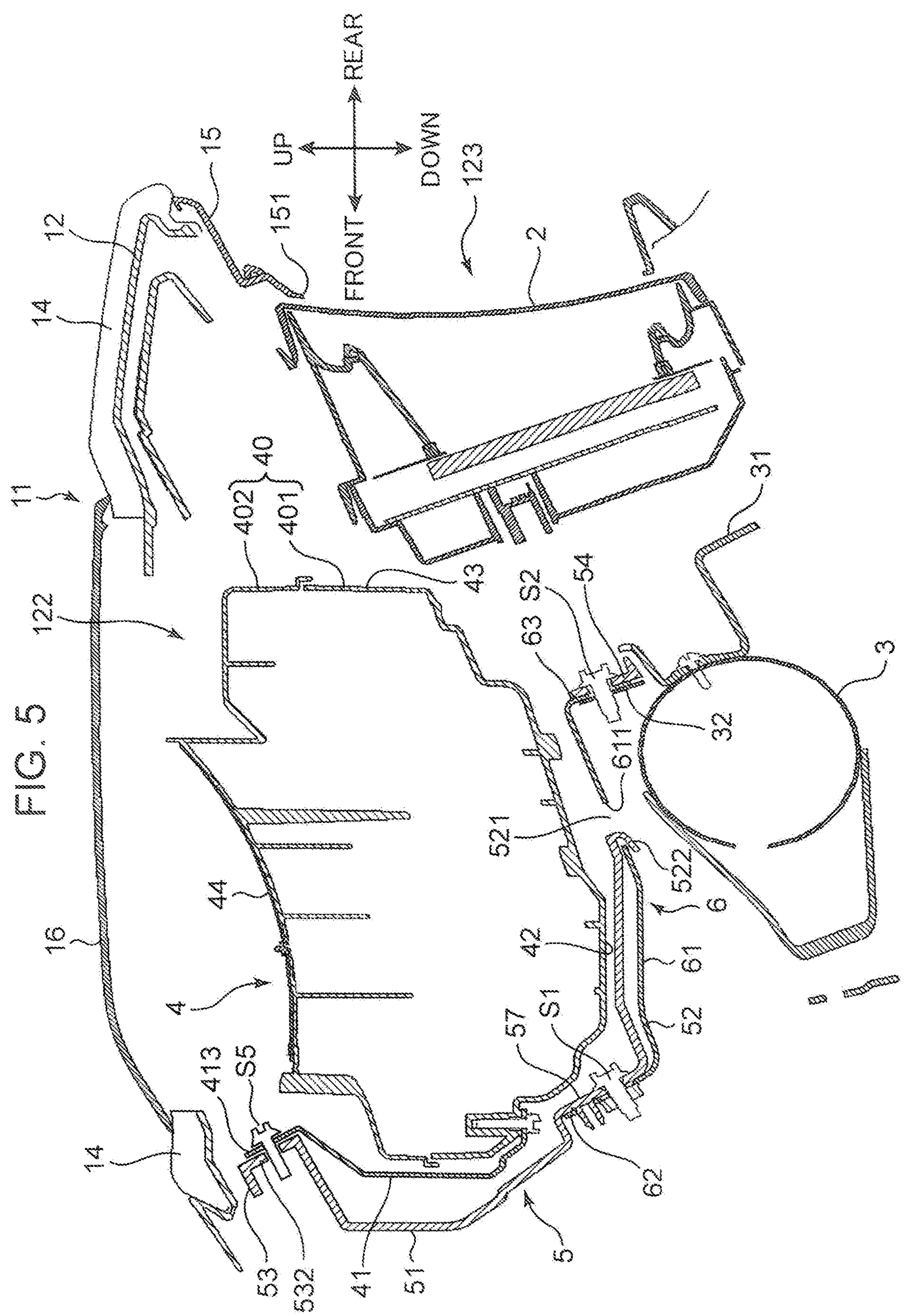
FIG. 5 is a schematic sectional view taken along line V-V in FIG. 1.
Figure 6:
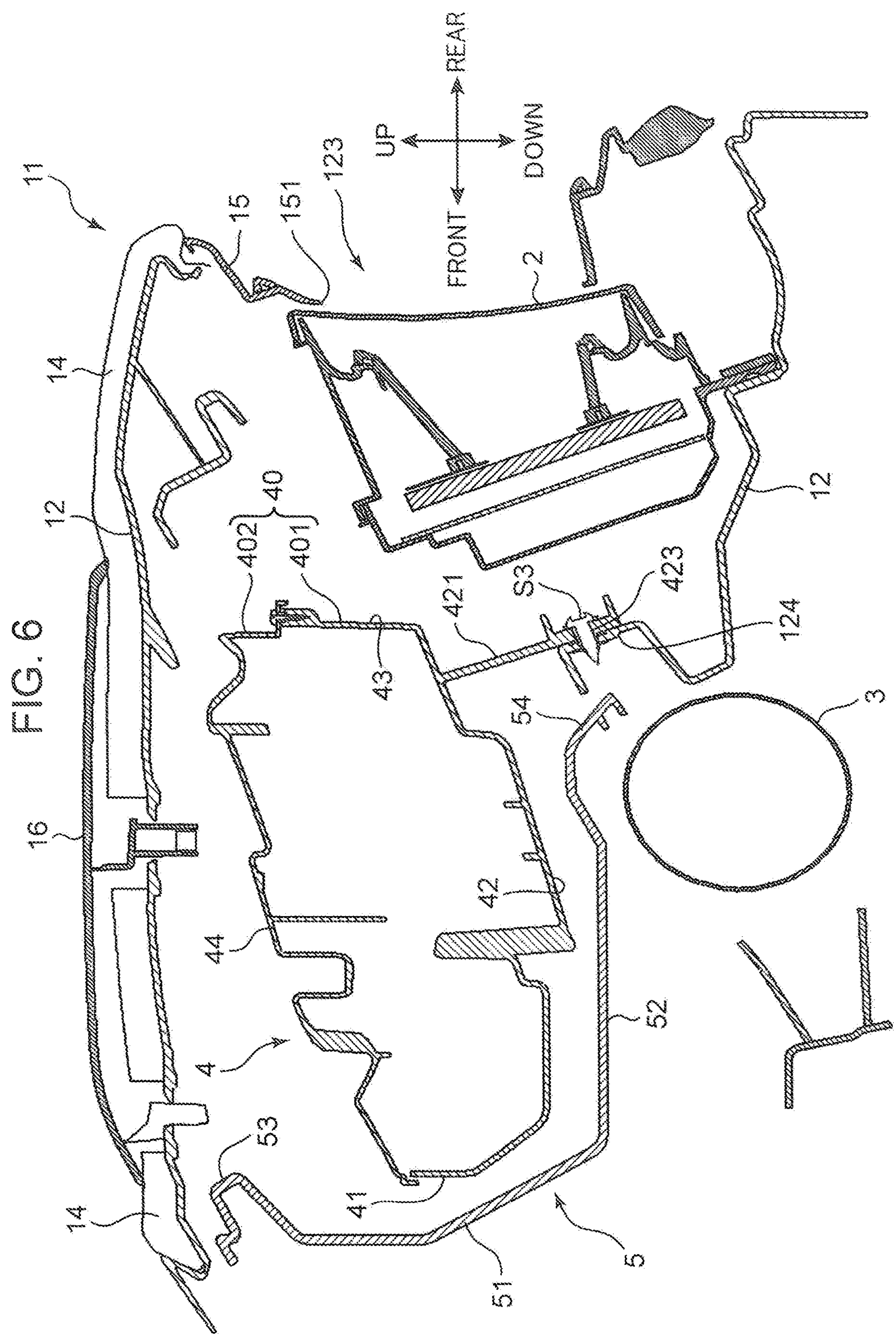
FIG. 6 is a schematic sectional view taken along line VI-VI in FIG. 1.

Next, a support structure for the HUD device 4 in the instrument panel 11 will be described. FIGS. 4 to 6 show a sectional structure, along the front-rear direction, of a portion of the instrument panel 11 to which the HUD device 4 is mounted. FIGS. 4, 5, and 6 are schematic sectional views taken along line IV-IV, line V-V, and line VI-VI in FIG. 1, respectively.

As shown in FIG. 4, the instrument panel 11 is disposed below the windshield 10, and the instrument panel 11 is supported by the instrument panel reinforcement 3 from below. The HUD device 4 is mounted to the instrument panel 11 while supported by a support member 5 between the windshield 10 and the instrument panel reinforcement 3.

The size of the HUD device 4 in the front-rear direction is larger than a clearance between a front edge 122F and a rear edge 122R of the upper opening 122. This holds true for the size of the HUD device 4 in the left-right direction. Therefore, even if the opening cover 16 is detached, it is impossible to take out the HUD device 4 upward from the instrument panel 11 as described above. In the embodiment, incidentally, even if the upper opening 122 is larger than the HUD device 4, it is impossible to take out the HUD device 4 from above, because the windshield 10 obstructs the HUD device 4.

<Housing of HUD Device>

Figure 7:
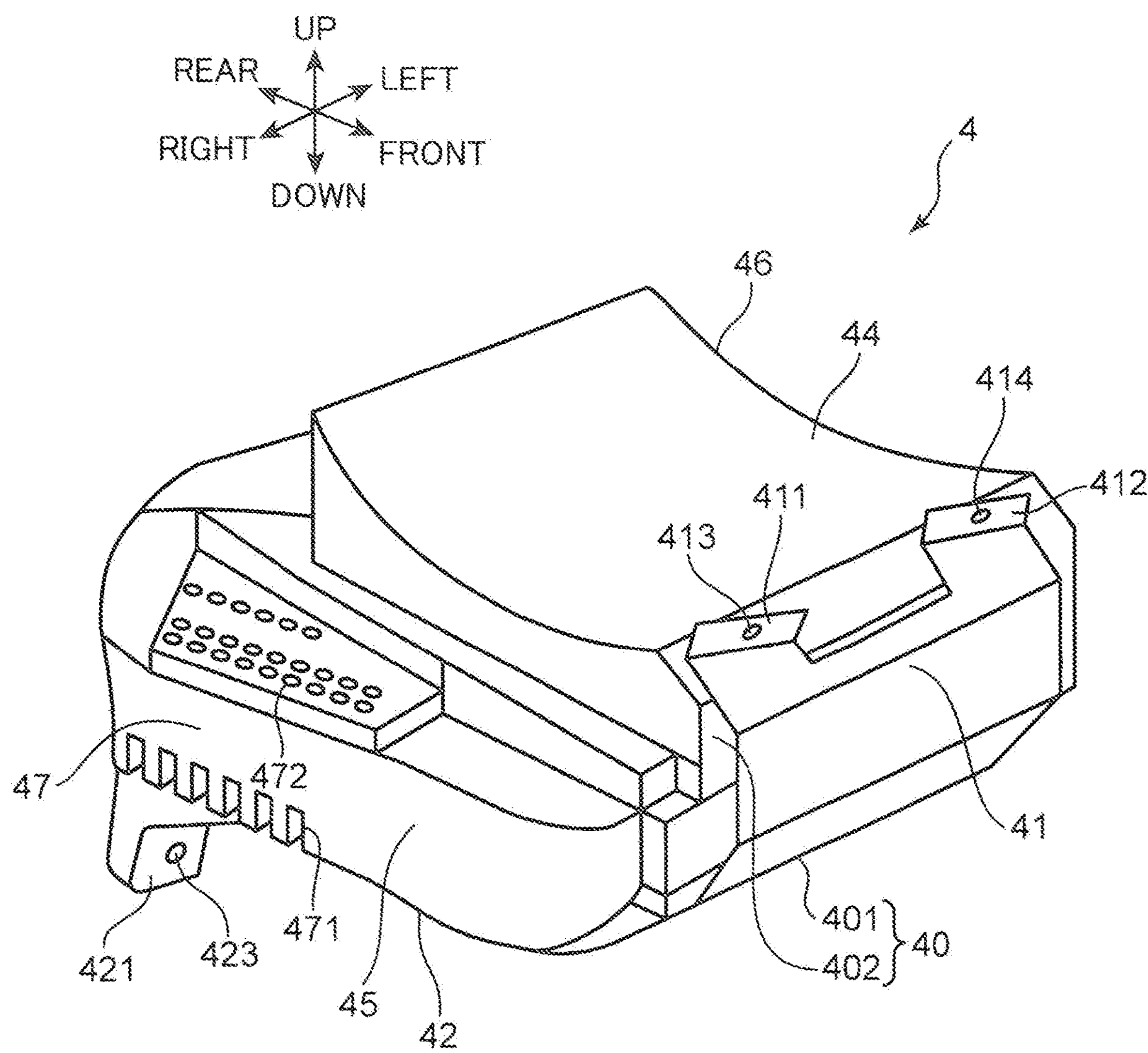
FIG. 7 is a perspective view of a head-up display device.
Figure 8:
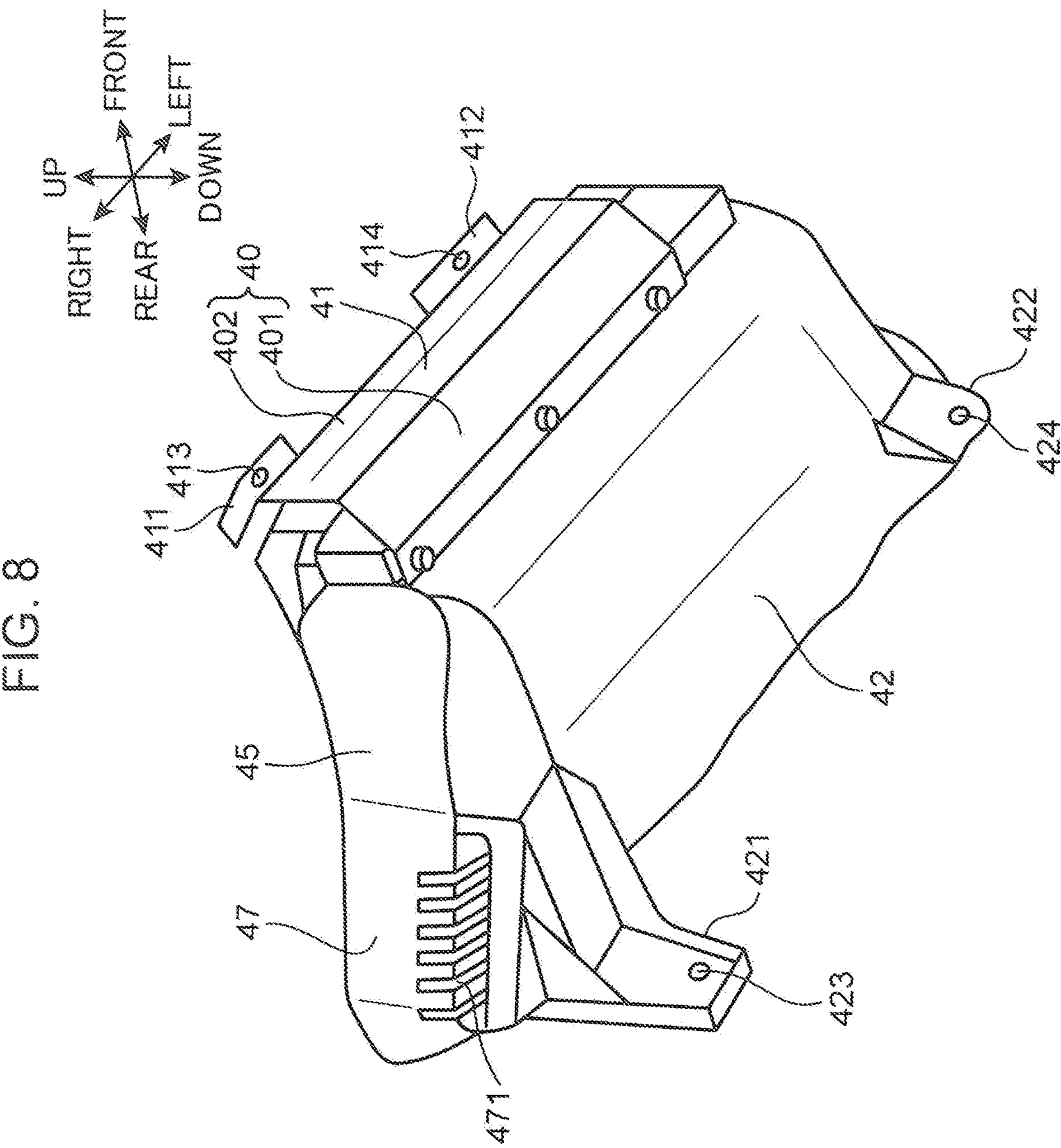
FIG. 8 is a perspective view of the head-up display device viewed from a different direction.

FIG. 7 is a perspective view of the HUD device 4 and FIG. 8 is a perspective view of the HUD device 4 viewed from a different direction. The HUD device 4 includes the housing 40 that houses the projection light source 4A and an optical system such as the mirrors. The housing 40 is formed by a main body 401 having an open upper face in which the projection light source A and the optical system are installed, and a lid body 402 that closes the opening of the main body 401. A translucent window portion, through which the projection light beam passes, is provided to a top face of the lid body 402.

The housing 40 has a substantially flat and rectangular parallelepiped shape and includes a front face 41, a lower face 42, a rear face 43, an upper face 44, a right face 45, and a left face 46. From left and right end portions of an upper end edge of the front face 41, a right upper bracket 411 and a left upper bracket 412 respectively extend upward. The brackets 411 and 412 respectively have fixing holes 413 and 414 and serve as fixing portions of the housing 40 to be fixed to the support member 5. From left and right end portions of a rear end edge of the lower face 42 (a lower end edge of the rear face 43), a right lower bracket 421 and a left lower bracket 422 extend downward. The brackets 421 and 422 respectively have fixing holes 423 and 424, and serve as fixing portions of the housing 40 to be fixed to the instrument panel main body 12. The right lower bracket 421 protrudes downward to be longer than the left lower bracket 422.

At a rear portion of the right face 45, a heat dissipating portion 47 that dissipates heat in the housing 40 is disposed. Here, FIG. 11 which is a schematic sectional view taken along line XI-XI in FIG. 1 is referred to. Near the rear portion of the right face 45 of the housing 40, the projection light source 4A and a heat sink 4B are housed. The projection light source 4A is driven by a driver (not shown) to perform a light emitting operation and generates heat by performing the light emitting operation. The heat sink 4B dissipates the heat generated by the projection light source 4A.

An outer peripheral face of the housing 40 adjacent to the heat sink 4B is the heat dissipating portion 47. The heat received by the heat sink 4B as a result of heat exchange with the projection light source 4A is dissipated to an outside of the housing 40 through the heat dissipating portion 47. A plurality of slits 471 are formed in a lower area of a wall face of the heat dissipating portion 47 and a plurality of air holes 472 are formed in an upper area of the wall face. The slits 471 and the air holes 472 contribute to increase in a heat dissipating effect of the heat dissipating portion 47.

<Support Member>

Figure 9:
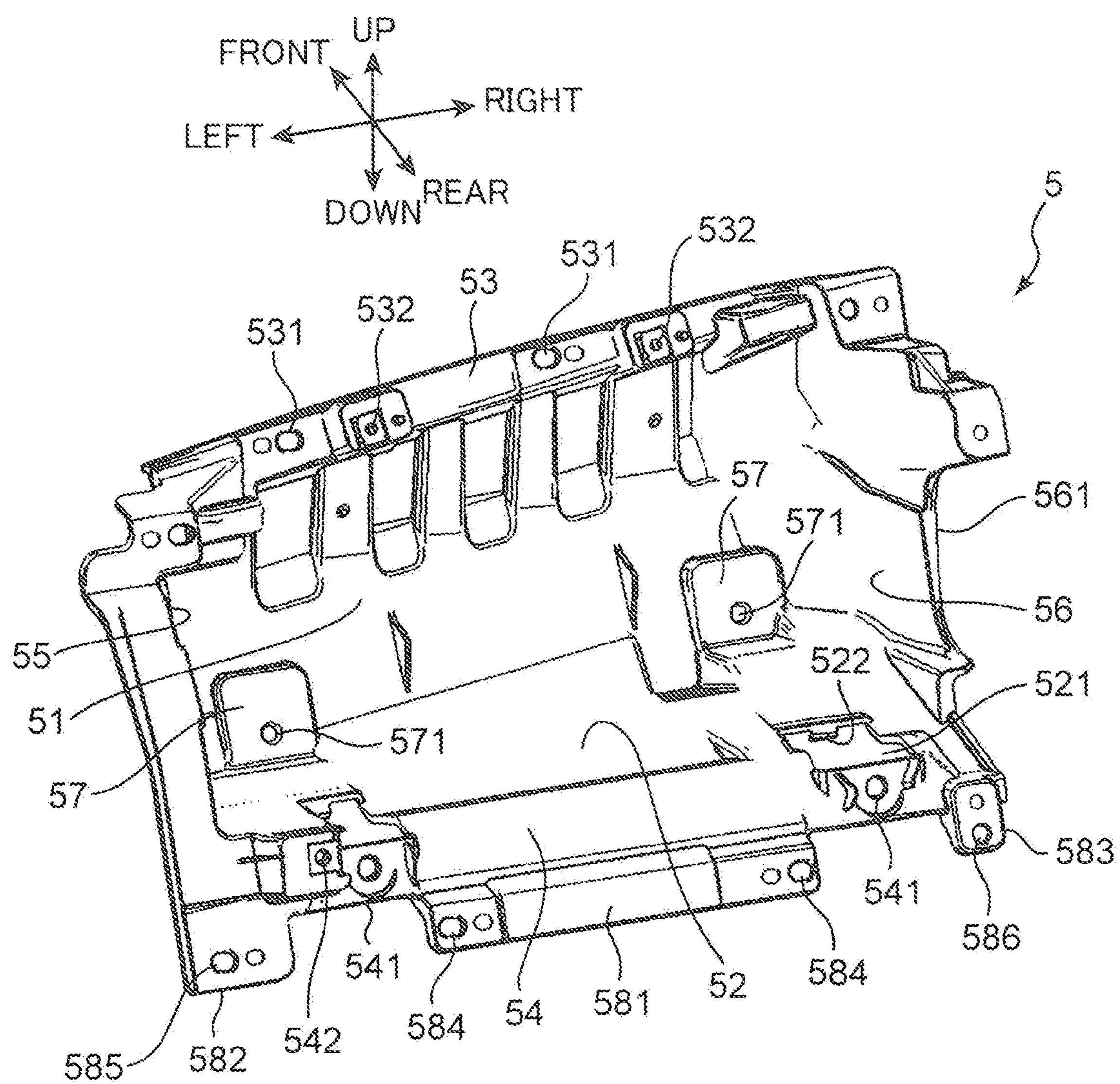
FIG. 9 is a perspective view of a support member.

The support member 5 is mounted into the instrument panel 11 below the upper opening 122 to fixedly support the HUD device 4 in a housed state. FIG. 9 is a perspective view of the support member 5. With reference mainly to FIGS. 9 and 5, the support member 5 is a member that has a front wall 51 and a lower wall 52 and has an L shape in a section along the front-rear direction. An upper flange portion 53 formed by a planar portion in a band shape long in the left-right direction protrudes upward from an upper end of the front wall 51. A lower flange portion 54 similarly formed by a planar portion in a band shape long in the left-right direction protrudes downward from a rear end of the lower wall 52.

The front wall 51 is a wall facing the front face 41 of the housing 40 and the lower wall 52 is a wall facing the lower face 42. A height position of the upper flange portion 53 is set so that the upper flange portion 53 is positioned at a higher position than the upper end of the front face 41 (a front end of the upper face 44) of the housing 40 when the HUD device 4 is supported by the support member 5. Therefore, a worker who uses a tool such as a screwdriver can access the upper flange portion 53 through the upper opening 122 by detaching the opening cover 16.

The upper flange portion 53 is provided with paired left and right fixing holes 531 that serve as fixing portions to be fixed to an upper portion of the instrument panel main body 12 and paired left and right support holes 532 that serve as fixing portions to be fixed to the HUD device 4. The lower flange portion 54 is provided with paired left and right fixing holes 541 that serve as fixing portions to be fixed to the instrument panel reinforcement 3. At positions of the lower wall 52 ahead of the paired fixing holes 541, rectangular window portions 521 are provided, respectively. From a front edge of each of the window portions 521, a hook-shaped lock piece 522 protrudes downward. Near a left end of the lower flange portion 54, a support hole 542 that serves as a fixing portion to be fixed to the HUD device 4 is provided.

A support member 5 also includes a left wall 55 and a right wall 56. The left wall 55 and the right wall 56 are walls that respectively close left faces and right faces of the front wall 51 and the lower wall 52. A clearance between the left wall 55 and the right wall 56 is larger than a width of the HUD device 4 in the left-right direction. On the other hand, the support member 5 does not have walls for its upper and rear faces. The housing 40 of the HUD device 4 is placed on the support member 5 with a most part of the housing 40 housed in a space defined by the front wall 51, the lower wall 52, the left wall 55, and the right wall 56, and without interference between the upper and rear faces 44 and 43 and the support member 5.

Figure 11:
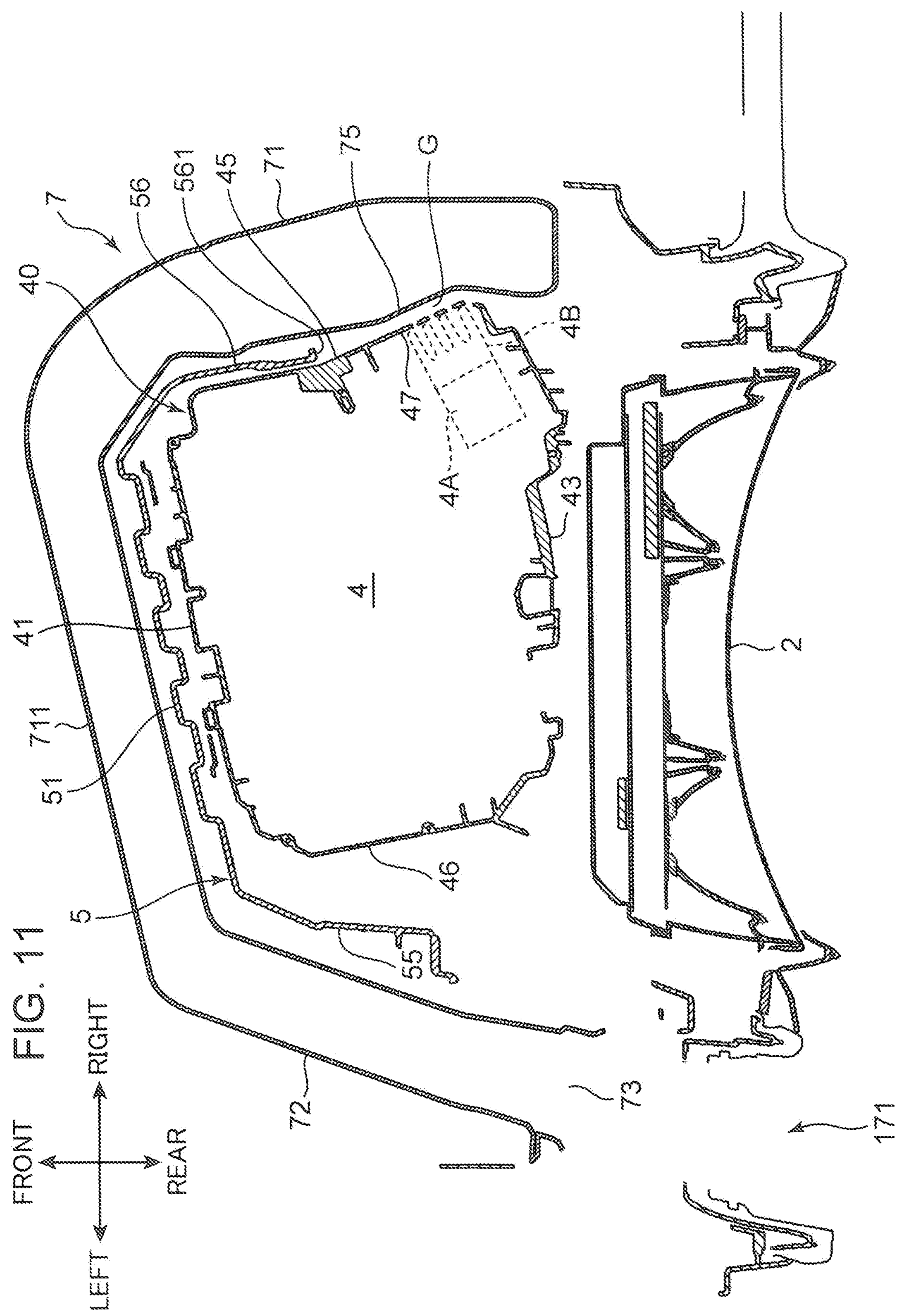
FIG. 11 is a schematic sectional view taken along line XI-XI in FIG. 1.

The right wall 56 is provided with a cut-away portion 561 formed by cutting away a rear portion of the right wall 56. As shown in FIG. 11, in the instrument panel 11, the air conditioning duct 7 is disposed to surround the sides of the support member 5, and a part (facing portion 75) of the air conditioning duct 7 is disposed outside the right wall 56. The cut-away portion 561 is an opening formed so as not to obstruct heat exchange between the heat dissipating portion 47 of the HUD device 4 and the part of the air conditioning duct 7.

At a lower end portion of the front wall 51, paired left and right lock portions 57 are disposed. Each of the lock portions 57 is a rectangular flat plate portion formed by making a shallow dent at a part of the front wall 51. In each of the lock portions 57, a threaded hole 571 that serves as a fixing portion to be fixed to the instrument panel reinforcement 3 is formed.

From a lower edge of the lower flange portion 54, a middle extending portion 581, a left extending portion 582, and a right extending portion 583 extend downward. The middle extending portion 581 is a flat plate portion that extends downward from a center in the left-right direction of the lower flange portion 54 and is long in the left-right direction, and paired left and right fixing holes 584 are formed in the middle extending portion 581. The fixing holes 584 serve as fixing portions of the support member 5 to be fixed to a lower portion of the instrument panel main body 12. The left extending portion 582 is a flat plate portion extending downward from a left end of the lower flange portion 54 and has a fixing hole 585 that similarly serves as a fixing portion to be fixed to the lower portion of the instrument panel main body 12. The right extending portion 583 is a small flat plate portion extending downward from a right end of the lower flange portion 54 and has a support hole 586 that similarly serves as a fixing portion to be fixed to the instrument panel main body 12.

<Instrument Panel Reinforcement>

Figure 10:
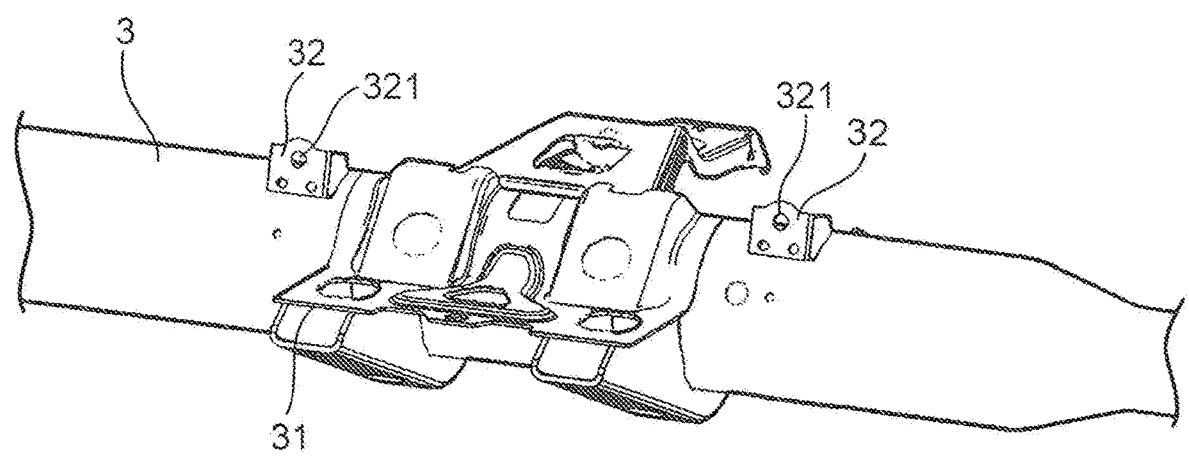
FIG. 10 is a perspective view of an instrument panel reinforcement.

FIG. 10 is a perspective view of a relevant portion of the instrument panel reinforcement 3. Instrument panel support hardware 31 and support pieces 32 are mounted to an outer peripheral face of the instrument panel reinforcement 3. The instrument panel support hardware 31 is hardware for connecting the lower face of the instrument panel 11 and the instrument panel reinforcement 3. As a result of the connection, the instrument panel 11 is supported by the instrument panel reinforcement 3 that is firmly supported by a vehicle body frame (not shown) and has the high rigidity.

The paired support pieces 32 are provided on the left and right sides of the instrument panel support hardware 31 and mounted to the outer peripheral face of the instrument panel reinforcement 3. The support pieces 32 are hardware pieces that connect the support member 5 supporting the HUD device 4 and the instrument panel reinforcement 3 so as to support the support member 5 on the instrument panel reinforcement 3. A support hole 321 is formed in each of the support pieces 32. In the embodiment, the support member 5 is supported by the instrument panel reinforcement 3 with support brackets 6 (described next) interposed therebetween.

<Support Brackets>

With reference to FIG. 5, each of the support brackets 6 is a plate-shaped member extending in the front-rear direction of the vehicle 1 below the HUD device 4. Each of the support brackets 6 includes a horizontal portion 61 provided along a lower face of the lower wall 52 of the support member 5, a front end portion 62 on a front side of the vehicle, and a rear end portion 63 on a rear side of the vehicle. By interposing the support brackets 6, it is possible to further increase support rigidity of the HUD device 4. The paired left and right support brackets 6 are mounted to positions of the support member 5 corresponding to the paired left and right lock portions 57.

The front end portion 62 is a portion to be fixed to the front wall 51 of the support member 5. The front end portion 62 is a rising portion formed by being bent upward from a front end of the horizontal portion 61 and extends upward along the front wall 51 to be overlaid on the lock portion 57. In other words, each of the support brackets 6 has such a shape as to extend around the support member 5 from below the lower wall 52 toward a front side of the front wall 51. The rear end portion 63 is a portion to be fixed to the instrument panel reinforcement 3 together with the lower flange portion 54. The rear end portion 63 is a portion formed by being bent downward from a rear end of the horizontal portion 61 and is sandwiched between the support piece 32 of the instrument panel reinforcement 3 and the lower flange portion 54 of the support member 5.

Figure 12:
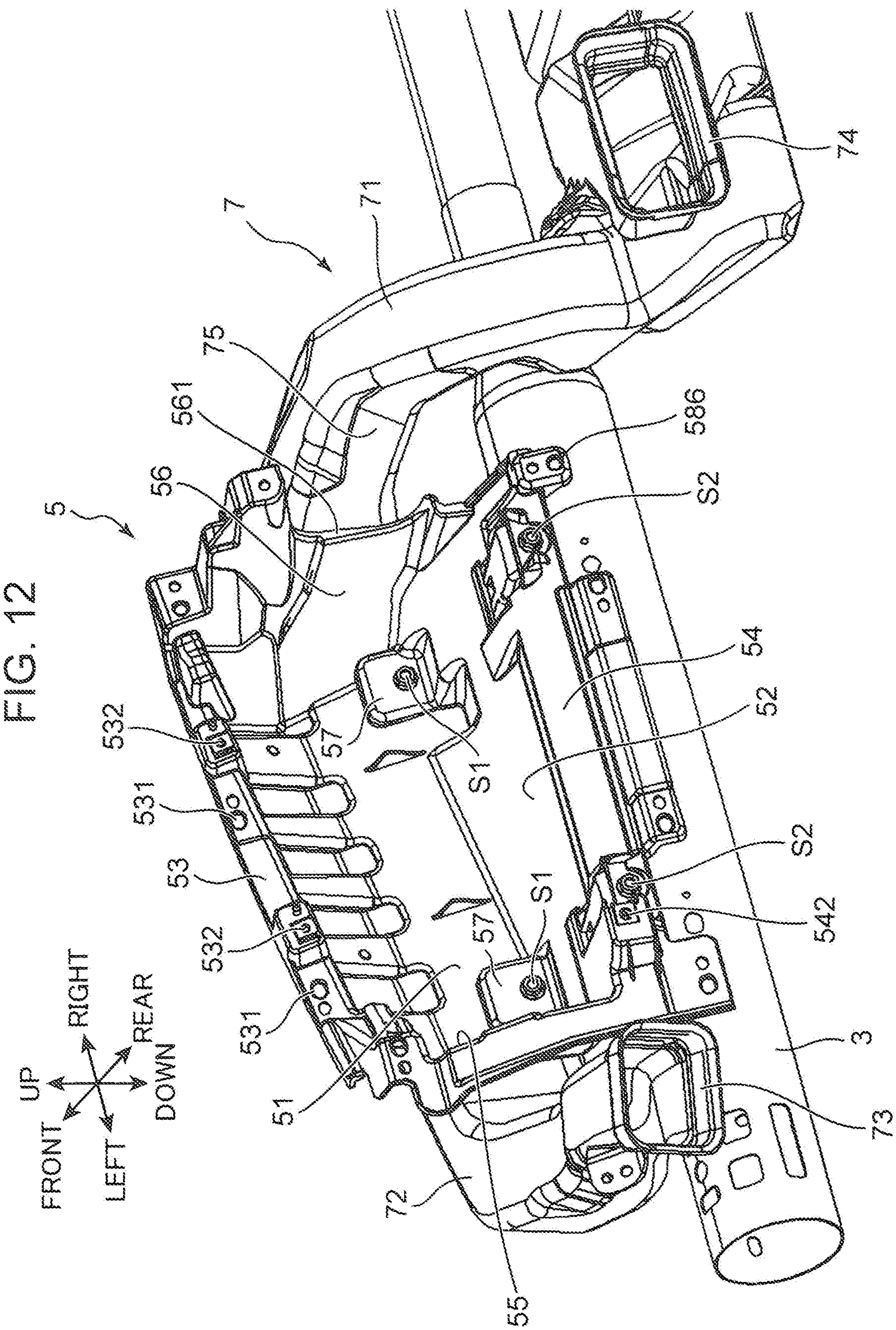
FIG. 12 is a perspective view showing an air conditioning duct and the support member.

With reference to FIGS. 5, 9, 10, and 12, a support structure of the support member 5 will be described. FIG. 12 is a perspective view showing a left portion of the instrument panel reinforcement 3, the support member 5, and the air conditioning duct 7. The air conditioning duct 7 will be described later. The front end portion 62 of each of the support brackets 6 is overlaid on an outer face of each of the lock portions 57 of the support member 5 in the front-rear direction. A through hole is formed in the front end portion 62 and the lock portion 57 and the front end portion 62 are positioned with each other so that the through hole and the threaded hole 571 in the lock portion 57 are aligned with each other. A first fixing screw 51 is inserted through the through hole and the threaded hole 571 to fix the support member 5 and the support bracket 6 to each other.

A through hole is formed in the rear end portion 63 of each of the support brackets 6 as well. The support piece 32 of the instrument panel reinforcement 3, the rear end portion 63, and the lower flange portion 54 of the support member 5 are overlaid on each other in the front-rear direction so that the through hole is aligned with the support hole 321 provided to the support piece 32 and the fixing hole 541 provided to the lower flange portion 54. A second fixing screw S2 is inserted through the through hole, the support hole 321, and the fixing hole 541 to fix the support member 5 and the support bracket 6 to the instrument panel reinforcement 3. Furthermore, as shown in FIG. 5, a window portion 611 is provided to the horizontal portion 61. The lock piece 522 of the support member 5 is fitted with a front edge of the window portion 611.

[Air Conditioning Duct]

Figure 13:
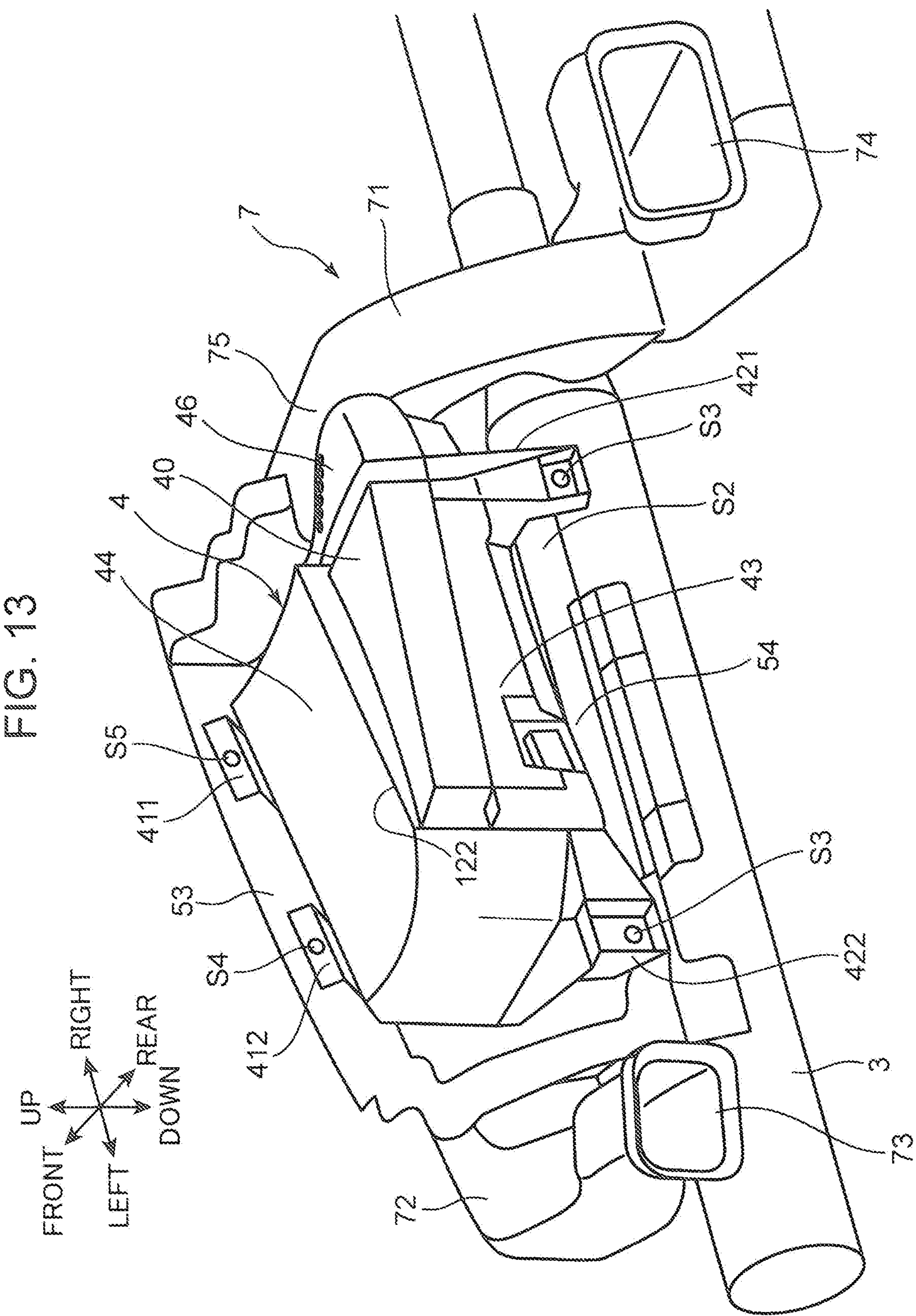
FIG. 13 is a perspective view showing the air conditioning duct, the support member, and the head-up display device.

The air conditioning duct 7 is a duct for supplying the conditioned air for heating, cooling, or dehumidification into the vehicle interior, the conditioned air being generated by an air conditioner (not shown) provided to the vehicle 1. FIG. 13 is a perspective view showing arrangement of the air conditioning duct 7, the HUD device 4, and the support member 5 with respect to each other. With reference to FIGS. 11 to 13, the air conditioning duct 7 includes a portion provided in the instrument panel 11 and has an upstream portion 71 and a downstream portion 72 around the support member 5.

The upstream portion 71 and the downstream portion 72 are duct portions that lead the conditioned air to a left duct end 73. The left duct end 73 is provided at a terminal end of the downstream portion 72 and communicates with the left blow outlet 171 provided near a left end of the instrument panel 11. FIGS. 12 and 13 also show a middle duct end 74 into which the conditioned air is introduced by another duct portion. The middle duct end 74 communicates with the middle blow outlet 172 provided to the console portion 121.

As shown in FIG. 11, the upstream portion 71 and the downstream portion 72 of the air conditioning duct 7 extend in the horizontal direction while detouring around the side faces of the support member 5, i.e., the side faces of the housing 40 of the HUD device 4. To put it specifically, the upstream portion 71 faces the right face 45 (first side face) of the housing 40 in the left-right direction with the right wall 56 of the support member 5 interposed therebetween. The downstream portion 72 faces the left face 46 (second side face), that faces the right face 45 in the vehicle width direction, in the left-right direction with the left wall 55 interposed therebetween. A detour portion 711 that is a duct connecting the upstream portion 71 and the downstream portion 72 faces the front face 41 in the front-rear direction with the front wall 51 interposed therebetween. The upstream portion 71 extends relatively close to the right face 45. On the other hand, the downstream portion 72 extends through an area around the left face 46 but is relatively away from the left face 46.

The upstream portion 71 extending along the right face 45 of the housing 40 has the facing portion 75 that faces the heat dissipating portion 47 disposed on a rear side of the right face 45 so as to be able to exchange heat with the heat dissipating portion 47. The upstream portion 71 is arranged side by side with the right face 45 so that the facing portion 75 faces the heat dissipating portion 47 with a predetermined gap G interposed therebetween. The cut-away portion 561 of the right wall 56 of the support member 5 is formed so as not to obstruct the heat exchange between the facing portion 75 and the heat dissipating portion 47.

A temperature of heat medium (conditioned air) flowing through the air conditioning duct 7 is lower than or equal to 30° C. at the highest even during heating operation. The temperature of the conditioned air is sufficiently lower than a temperature of the heat generated by the projection light source 4A. Therefore, when the heat of the projection light source 4A is dissipated from the heat dissipating portion 47 through the heat sink 4B, the heat is absorbed by the conditioned air flowing toward the left duct end 73 via the facing portion 75. Therefore, the HUD device 4 can satisfactorily dissipate the heat.

The facing portion 75 is a flat plate-shaped portion that is the closest portion of the air conditioning duct 7 to the HUD device 4 (housing 40). The gap G may be about several millimeters to 20 mm in dimension. If the gap G is excessively small or the facing portion 75 is in contact with the heat dissipating portion 47, it is preferable in terms of heat exchange. However, when the vehicle 1 vibrates, the vibration is transmitted to the HUD device 4, which may generate vibrational noise at the facing portion or may vibrate the projection image. On the other hand, if the gap G is excessively large, heat exchange efficiency between the facing portion 75 and the heat dissipating portion 47 reduces and therefore the heat dissipation from the HUD device 4 tends to be performed insufficiently.

<Attachment and Detachment of HUD Device>

As shown in FIG. 13, in a state in which the HUD device 4 is mounted in a predetermined position of the instrument panel main body 12 (support member 5), the right upper bracket 411 and the left upper bracket 412 overlap the upper flange portion 53 of the support member 5 in the front-rear direction above the HUD device 4. At this time, the fixing holes 413 and 414 of both the brackets 411 and 412 are respectively aligned with the support holes 532 (FIG. 9) of the upper flange portion 53. Fourth fixing screws S4 fix both the brackets 411 and 412 and the upper flange portion 53 to each other.

Below the HUD device 4, in the front-rear direction, the right lower bracket 421 overlaps a support plate portion 124 of the instrument panel main body 12 in front of the right extending portion 583 and the left lower bracket 422 overlaps a left portion of the lower flange portion 54. The fixing hole 423 of the right lower bracket 421 and a threaded hole of the support plate portion 124 are aligned with each other and the right lower bracket 421 and the support plate portion 124 are fastened to each other by a third fixing screw S3. FIG. 6 is the sectional view of a portion of the right lower bracket 421 fixed by the third fixing screw S3. The fixing hole 424 of the left lower bracket 422 and the support hole 542 of the lower flange portion 54 are aligned with each other and the left lower bracket 422 and the lower flange portion 54 are fastened to each other by the third fixing screw S3.

As shown in FIG. 3, the HUD device 4 is attached to and detached from the instrument panel main body 12 through the side opening 123. As described above, the upper flange portion 53 extends farther upward than the upper end of the front face 41 of the housing 40. The right upper and left upper brackets 411 and 412 also protrude upward from the housing 40. Therefore, in a state in which the opening cover 16 is detached, the worker can fasten the fourth fixing screw S4 through the upper opening 122. In a state in which the meter panel 2 and the meter cover 15 are detached, the worker can fasten the third fixing screws S3 through the side opening 123.

To detach the HUD device 4 from the instrument panel 11, the worker first detaches the opening cover 16, the meter panel 2, and the meter cover 15 from the instrument panel main body 12. After that, the worker accesses and detaches the fourth fixing screw S4 through the upper opening 122 and accesses and detaches the third fixing screws S3 through the side opening 123. Then, the HUD device 4 is taken out through the side opening 123.

[Operation and Effects]

According to the interior structure for the vehicle 1 described above, it is possible to achieve the satisfactory heat dissipation from the HUD device 4 by utilizing the air conditioning duct 7 provided in the instrument panel 11. In other words, the HUD device 4 includes the heat dissipating portion 47 on the right face 45 of the housing 40, and the air conditioning duct 7 includes the facing portion 75 that faces the heat dissipating portion 47 to be able to exchange heat with the heat dissipating portion 47. Therefore, it is possible to cause the heat medium flowing through the air conditioning duct 7 to absorb the heat generated by the heat dissipating portion 47 to thereby allow the HUD device 4 to satisfactorily dissipate heat. The air conditioning duct 7 is mounted into the instrument panel 11 of the general vehicle 1 as a duct such as an instrument panel duct for blowing the conditioned air out of the instrument panel 11 into the vehicle interior. Therefore, it is unnecessary to newly add a cooling functional component for cooling the HUD device 4.

The facing portion 75 faces the heat dissipating portion 47 with the predetermined gap G interposed therebetween. In other words, the facing portion 75 and the heat dissipating portion 47 are not in contact with each other at a portion where they face each other. Therefore, even if the vehicle 1 vibrates, it is possible to prevent generation of the vibrational noise at the portion where the facing portion 75 and the heat dissipating portion 47 face each other.

The facing portion 75 is arranged side by side with the right face 45 provided with the heat dissipating portion 47. In other words, the facing portion 75 is disposed so as to be positioned beside the heat dissipating portion 47. Therefore, even if condensation occurs on the air conditioning duct 7, condensed water does not drop onto the housing 40 of the HUD device 4.

The housing 40 of the HUD device 4 includes the right face 45 (first side face) and the left face 46 (second side face) facing each other in the vehicle width direction, and the heat dissipating portion 47 is disposed on the right face 45. The air conditioning duct 7 includes the upstream portion 71 having the facing portion 75 and extending along the right face 45, the downstream portion 72 extending near the left face 46, and the left duct end 73 (blow outlet) provided to the terminal end of the downstream portion 72. Therefore, the heat exchange between the heat dissipating portion 47 and the facing portion 75 is not performed in the downstream portion 72 where the left duct end 73 is disposed but performed in the upstream portion 71 that is disposed apart from the downstream portion 72 toward an upstream side in a flowing direction of the conditioned air. Therefore, it is possible to prevent the heat exchange from affecting the controlled conditioned air. For example, it is possible to prevent mixing of warm air of the heat exchange into cooling air immediately before the cooling air is blown out of the left duct end 73.

The interior structure includes the support member 5 that is mounted into the instrument panel 11 to fixedly support the HUD device 4 in the housed state. In this way, even the heavy-weight HUD device 4 can be firmly supported by the support member 5. Moreover, the support member 5 has the cut-away portion 561 at the portion where the heat dissipating portion 47 and the facing portion 75 face each other. Therefore, the heat exchange between the heat dissipating portion 47 and the facing portion 75 is not obstructed.

[Description of Modifications]

Although the embodiment of the present invention has been described above, the present invention is not limited to it and the following modifications are conceivable.

(1) In the example described in the above-described embodiment, the facing portion 75 faces the heat dissipating portion 47 with the predetermined gap G interposed therebetween. In order to increase the heat exchange efficiency, the facing portion 75 and the heat dissipating portion 47 may be in contact with each other. In this case, it is preferable to firmly fix the housing 40 of the HUD device 4 and the air conditioning duct 7 so that the vibrational noise does not occur.

(2) As another method of increasing the heat exchange efficiency, a spacer member with excellent heat conductivity and a cushioning property may be provided in the gap G. Alternatively, a heat receiving member such as a metal sheet may be stuck on or wound around the facing portion 75 to facilitate absorption of radiant heat from the heat dissipating portion 47.

(3) In the example described in the above embodiment, the facing portion 75 is the flat plate-shaped portion provided to the air conditioning duct 7. It is preferable to adapt a shape of the facing portion 75 to a shape of an outer surface of the heat dissipating portion 47. For example, if the heat dissipating portion 47 has a protruding shape, the facing portion 75 preferably has a recessed shape.

(4) In the example described in the above embodiment, the support member 5 that fixedly supports the HUD device 4 in the housed state is used. It is also possible to directly mount the housing 40 of the HUD device 4 to the instrument panel main body 12 without using the support member 5.

Lastly, the characteristic structures disclosed in the above embodiment and the operation and effects based on the structures will be summarized.

According to an aspect of the present invention, the interior structure for the vehicle includes an instrument panel disposed below the windshield, the air conditioning duct provided inside the instrument panel, and the head-up display device having the housing structure and mounted to the instrument panel, the head-up display device being configured to project the information on the windshield, wherein the head-up display device has the heat dissipating portion on the outer peripheral face of the housing, and the air conditioning duct has the facing portion that faces the heat dissipating portion so as to be able to exchange heat with the heat dissipating portion.

With the interior structure, the heat exchange is performed between the heat dissipating portion of the head-up display device and the facing portion of the air conditioning duct. Therefore, it is possible to satisfactorily dissipate the heat in the housing of the head-up display device by use of the heat medium (conditioned air) flowing through the air conditioning duct. The air conditioning duct is mounted into the instrument panel of the general vehicle as the duct such as the instrument panel duct for blowing the conditioned air out of the instrument panel into the vehicle interior. Therefore, it is unnecessary to newly add a cooling functional component.

In the interior structure, the facing portion preferably faces the heat dissipating portion with the predetermined gap interposed therebetween.

With the interior structure, because the facing portion and the heat dissipating portion are not in contact with each other at the portion where they face each other. Therefore, even if the vehicle vibrates, it is possible to prevent generation of the noise at the portion where the facing portion and the heat dissipating portion face each other.

In the above-described interior structure, preferably, the housing has a side face, the heat dissipating portion is disposed on the side face, and the facing portion is disposed side by side with the side face provided with the heat dissipating portion.

With the interior structure, the facing portion is disposed side by side with the heat dissipating portion. Therefore, even if the condensation occurs on the air conditioning duct, the condensed water does not drop onto the housing of the head-up display device.

In the above-described interior structure, the housing includes the first side face and the second side face facing each other in the vehicle width direction of the vehicle, the side face on which the heat dissipating portion is disposed is the first side face, and the air conditioning duct includes the upstream portion having the facing portion and extending along the first side face, the downstream portion extending near the second side face, and the blow outlet provided to the terminal end of the downstream portion.

With the interior structure, the heat exchange with the heat dissipating portion is not performed in the downstream portion where the blow outlet is disposed but performed in the upstream portion that is disposed apart from the downstream portion. Therefore, it is possible to prevent the heat exchange from affecting the controlled conditioned air. For example, it is possible to prevent mixing of the warm air of the heat exchange into the cooling air immediately before the cooling air is blown out of the blow outlet.

In the interior structure, preferably, the support member that is mounted into the instrument panel to fixedly support the head-up display device in the housed state is provided, and the support member has the cut-away portion at the portion where the heat dissipating portion and the facing portion face each other.

With the interior structure, even the heavy-weight head-up display device can be firmly supported by the support member. Moreover, because the support member has the cut-away portion, the heat exchange between the heat dissipating portion and the facing portion is not obstructed.

According to the present invention described above, it is possible to provide the interior structure for the vehicle, in which heat dissipating performance of the head-up display device mounted to the instrument panel is improved without the additional cooling functional component.

The invention claimed is:

1. An interior structure for a vehicle, the interior structure comprising:

an instrument panel disposed below a windshield;

an air conditioning duct provided inside the instrument panel; and a head-up display device having a housing structure and mounted to the instrument panel, the head-up display device being configured to project information on the windshield, wherein the head-up display device has a heat dissipating portion on an outer peripheral face of the housing, the air conditioning duct has a facing portion that faces the heat dissipating portion so as to be able to exchange heat with the heat dissipating portion, and the facing portion faces the heat dissipating portion with a predetermined gap interposed between the heat dissipating portion and the facing portion.

2. The interior structure for the vehicle according to claim 1, wherein the housing has a side face, the heat dissipating portion is disposed on the side face, and the facing portion is disposed side by side with the side face provided with the heat dissipating portion.

3. The interior structure for the vehicle according to claim 2, wherein the housing includes a first side face and a second side face facing each other in a vehicle width direction of the vehicle, the side face on which the heat dissipating portion is disposed is the first side face, and the air conditioning duct includes an upstream portion having the facing portion and extending along the first side face, a downstream portion extending through an area around the second side face, the downstream portion being spaced apart from the second side face by a distance greater than a distance between the first side face and the upstream portion, and a blow outlet provided to a terminal end of the downstream portion.

4. The interior structure for the vehicle according to claim 1, further comprising a support member that is mounted into the instrument panel to fixedly support the head-up display device in a housed state, wherein the support member has a cut-away portion at a portion where the heat dissipating portion and the facing portion face each other.

5. The interior structure for the vehicle according to claim 2, further comprising a support member that is mounted into the instrument panel to fixedly support the head-up display device in a housed state, wherein the support member has a cut-away portion at a portion where the heat dissipating portion and the facing portion face each other.

* * * * *